(12) United States Patent
Yianilos

(10) Patent No.: US 6,411,973 B1
(45) Date of Patent: Jun. 25, 2002

(54) METHOD FOR FACILITATING USER ACCESS TO STORED INFORMATION IN AN ELECTRONIC TEXT

(75) Inventor: Peter Nicholas Yianilos, Princeton, NJ (US)

(73) Assignee: Franklin Electronic Publishers, Incorporated, Burlington, NJ (US)

( * ) Notice: Subject to any disclaimer, the term of this patent is extended or adjusted under 35 U.S.C. 154(b) by 1263 days.

(21) Appl. No.: 08/767,220

(22) Filed: Dec. 16, 1996

Related U.S. Application Data

(63) Continuation of application No. 08/497,636, filed on Jun. 30, 1995, which is a continuation of application No. 08/153,869, filed on Nov. 16, 1993, now abandoned, which is a continuation of application No. 07/529,867, filed on May 29, 1990, now abandoned.

(51) Int. Cl.[7] .............................................. G06F 15/00
(52) U.S. Cl. ...................... 707/512; 707/507; 707/514; 707/529
(58) Field of Search ................................ 395/800, 145; 364/419

(56) References Cited

U.S. PATENT DOCUMENTS

| | | | | |
|---|---|---|---|---|
| 4,625,295 A | * | 11/1986 | Skinner | 364/DIG. 2 |
| 4,773,009 A | * | 9/1988 | Kucera et al. | 364/419 |
| 4,799,191 A | * | 1/1989 | Yoshimura | 364/900 |
| 4,855,725 A | * | 8/1989 | Fernandez | 340/706 |
| 4,864,502 A | * | 9/1989 | Kucera et al. | 364/419 |
| 4,879,648 A | * | 11/1989 | Cochran et al. | 364/300 |
| 4,974,191 A | * | 11/1990 | Amirghodsi et al. | 364/900 |
| 4,985,697 A | * | 1/1991 | Boulton | 340/750 |
| 5,083,268 A | * | 1/1992 | Hemphill et al. | 364/DIG. 1 |
| 5,111,398 A | * | 5/1992 | Nunberg et al. | 364/DIG. 1 |
| 5,146,552 A | * | 9/1992 | Cassorla et al. | 395/145 |
| 5,199,104 A | * | 3/1993 | Hirayama | 395/145 |
| 5,210,689 A | * | 5/1993 | Baker et al. | 364/419 |
| 5,239,665 A | * | 8/1993 | Tsuchiya | 395/800 |
| 5,265,242 A | * | 11/1993 | Fujisawa et al. | 395/600 |

* cited by examiner

*Primary Examiner*—Majid A. Banankhah
(74) *Attorney, Agent, or Firm*—Reed Smith LLP

(57) ABSTRACT

A technique for providing simplified and more flexible text recovery in an electronically stored text. The text storage device is of the hand-held type and may accommodate the text of the entire bible, for example. The user may access the stored text in a read or search mode. The device is programmed to perform certain functions automatically, such as: selecting search or read mode; accommodating different syntax formulations; providing a fixed screen map of respective different portions of the text; and visually indicating specific words of a search to which a search will be limited. Expanded flexibility is also programmed into the device which includes: optionally expanding searches to cover both different forms of the same words and unrelated words having the same meaning; providing assistance to the user upon request which takes into account the current operational phase; and providing the capability of tagging a preselected location in the text for simplified access during reacquisition.

12 Claims, 8 Drawing Sheets

NOTE: IT IS POSSIBLE TO PRESS HELP WHILE READING HELP INFORMATION, AND RECEIVE INFORMATION ABOUT THE HELP SYSTEM.

METHOD FOR FACILITATING USER ACCESS TO STORED INFORMATION IN AN ELECTRONIC TEXT

This is a continuation of application Ser. No. 08/497,636, filed Jun. 30, 1995 which is a continuation of application Ser. No. 08/153,869, filed Nov. 16, 1993 now abandoned, which is a continuation of application Ser. No. 07/529,867, filed May 29, 1990 now abandoned.

Cross Reference to Related Application

Reference is made to the application entitled "Electronic Text" by the same inventor filed simultaneously herewith and bearing application Ser. No. 529,868, now granted as U.S. Pat. No. 5,153,831. The contents of that application are incorporated herein by reference.

Microfiche Appendix

A microfiche appendix forms part of this application which includes 6 sheets and 311 frames of microfiche.

BACKGROUND OF THE INVENTION

The present invention relates to techniques for accessing textual information stored in an electronic memory and for providing simplified and more flexible text accessing techniques to the user.

More particularly, the present invention relates to an electronically stored text in a hand-held device having a keyboard and screen wherein various keys in distinct sequences may be actuated to interactively provide different modes for analyzing the text. The device is programmed to minimize user interaction in a number of such modes.

Electronic devices for providing word-related operation and manipulation are known. Such devices, such as the Electronic Spelling Machine disclosed in U.S. Pat. No. 4,830,618, include a keyboard, screen and permanent electronic storage, i.e., a read-only memory. Techniques for the retrieval of individual words, however, are not necessarily appropriate when dealing with electronic storage of a complete comprehensive text.

When considering the presentation of a full text, such as the Bible, in a hand-held machine intended for personal and repeated use, it is important to provide techniques which avoid excessive keyboard manipulation and at the same time provide a variety of approaches for accessing, using and reusing the stored text.

It is an object of the present invention to provide a simplified but varied and effective technique for accessing electronically stored textual information.

It is a further object of the present invention to provide such technique in a hand-held text storage machine.

In accordance with the invention, in a method for providing user access to stored textual information in an electronic book, the method having search and read modes of access, the improvement comprises providing simplified and more flexible user operation steps. These steps include selecting search or read mode automatically, accommodating different syntax formulations of an entry word or phrase in the read mode, optionally expanding searches to cover different forms of the same word and unrelated words having the same meaning, providing the capability of tagging a preselected location in the text for simplified access during reacquisition of textual information, providing a map of different fixed locations on the screen corresponding to respective different portions of the text, providing assistance to the user upon request which takes into account the current operational phase and visually indicating specific words of a search request to which a search will be limited.

For a better understanding of the present invention, reference is made to the following description and accompanying drawings while the scope of the invention will be pointed out in the appended claims.

BRIEF DESCRIPTION OF THE DRAWINGS

Referring to the drawings.

DESCRIPTION OF THE PREFERRED EMBODIMENTS

Figure 1:
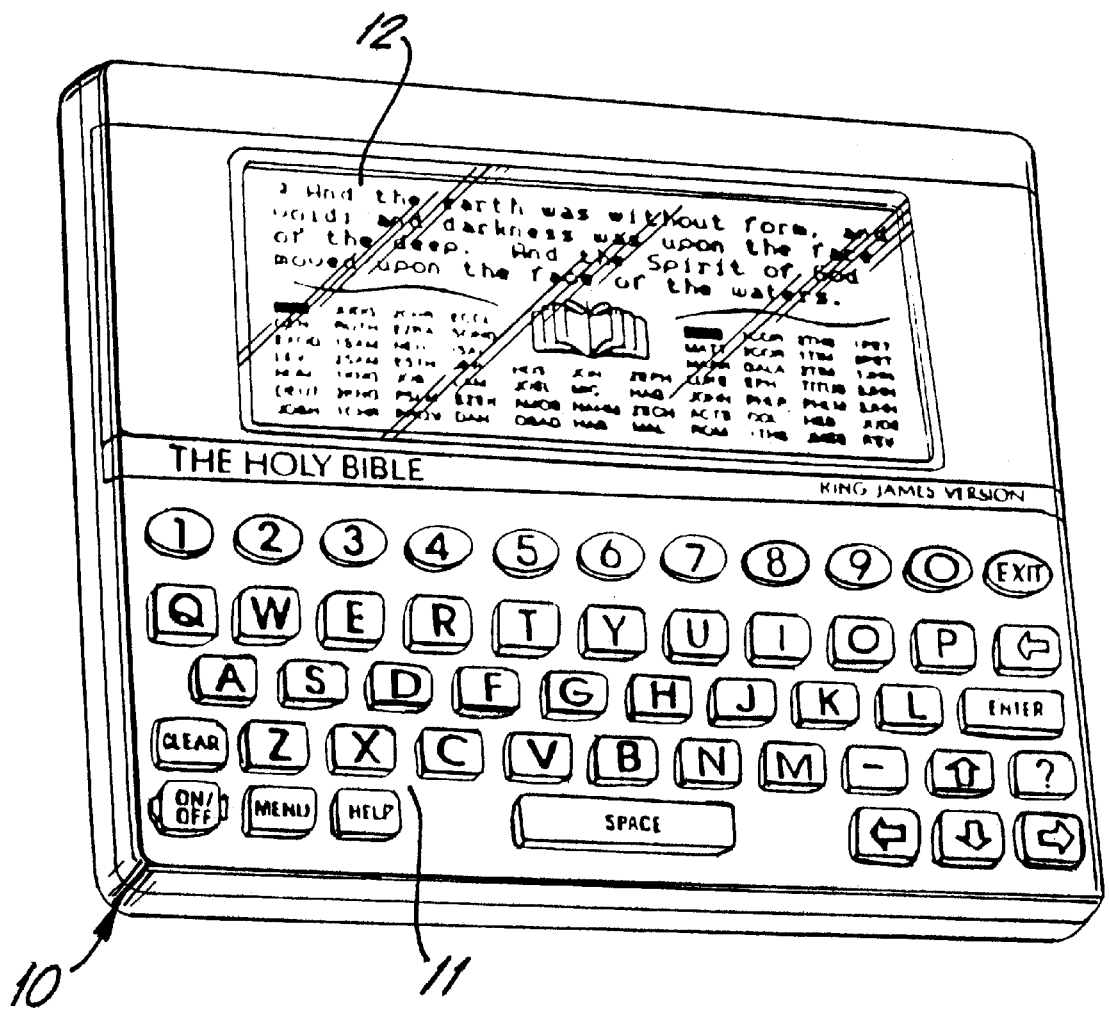
FIG. 1 is a perspective view of an embodiment of the present invention.

An embodiment of the present invention shown in FIG. 1, incorporates, as stored text, the King James version of the Holy Bible.

The device 10 includes a keyboard 11 and screen 12. The keyboard 11 presents the standard keys of an ordinary typewriter and other more or less standard operating keys of a word processor. The latter include the CLEAR, MENU, HELP, ENTER, EXIT and CURSOR CONTROL KEYS. An ON/OFF control is also included.

The user of any stored textual material may desire to read designated sections, e.g., chapter and verse of the Bible, or may desire to find a specific section by entering a key word or words (by searching).

Automatic Mode Selection

In the device of the present invention, these two basic functions, "read" and "search", are determined automatically without requiring user mode selection. This is done by the device 10, by parsing the input string (the word or words entered on the screen) and switching into the appropriate mode.

Specifically, the user need only press the ON/OFF switch, type in the inquiry, press ENTER and get a result. The results will require further steps such as selection within the result (discussed below) or advancing the text in order to read the text presented. The important thing is that the user obtains the result after entering the inquiry without having to select a mode.

The parsing operation is defined as follows.

The user's query is submitted to the parser, which tries to parse it as a read-mode request. Read-mode requests consist of a "book" (with optional "volume" specifier attached), an optional "chapter", and (if a chapter has been specified) a "verse". If a query fails to parse as a read-mode request, the parser BAILS OUT and treats it as a search request.

The parser starts at the beginning of the query. If it manages to isolate a book/volume name, it moves past this and then, from its new position in the query, attempts to isolate a chapter specification, etc.

Figure 2A:
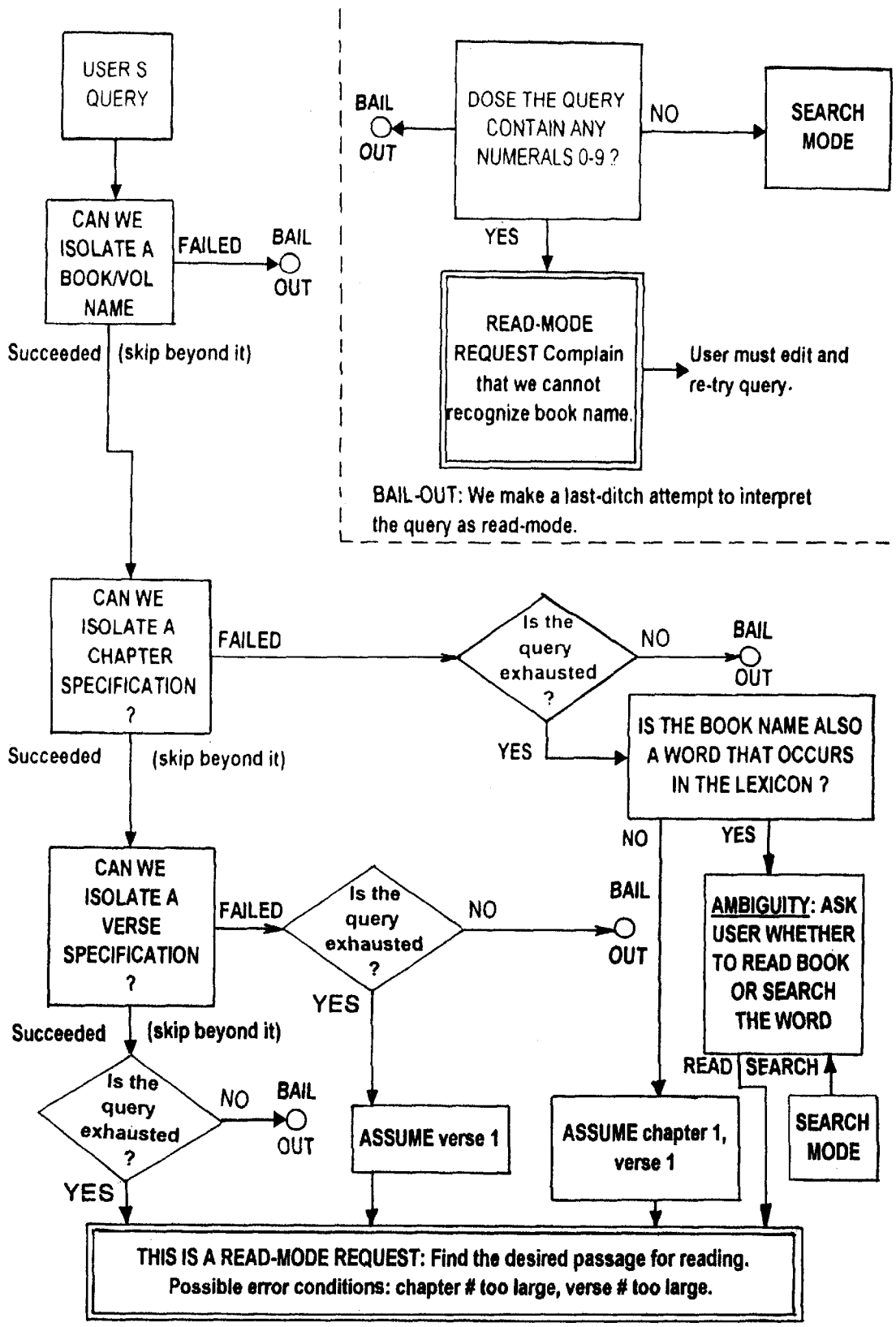
FIG. 2a is a flow chart illustrating automatic mode selection in accordance with the invention.

A flow chart of the automatic mode selection step is presented in FIG. 2a.

There are certain situations in which the input is inherently ambiguous as to whether the "search" mode or "read" mode is required. Thus, for example, if an individual enters LUKE, it is not clear as to whether the individual wishes to read the books of LUKE or wishes to locate all of those positions in the Bible where the name "Luke" appears. In such situation, the machine will ask the user to select whether to "read" or "search" by selecting one of two keys (e.g. 1 for read or 2 for search)

Bookmark Function

The device provides the user with the ability to electronically "tag" a certain number of text locations much like a bookmark for quickly and automatically returning to those locations.

The preferred embodiment provides four such bookmark locations. To set a bookmark at a particular location, the "MENU" key is pressed followed by the "B" key. After setting of the bookmark, when the MENU key is pressed, the various set bookmarks appear on the screen. Any one may be selected by pressing the "B" key followed by the numerical key (1 or 2 or 3 or 4) for the desired bookmark.

Figure 2B:
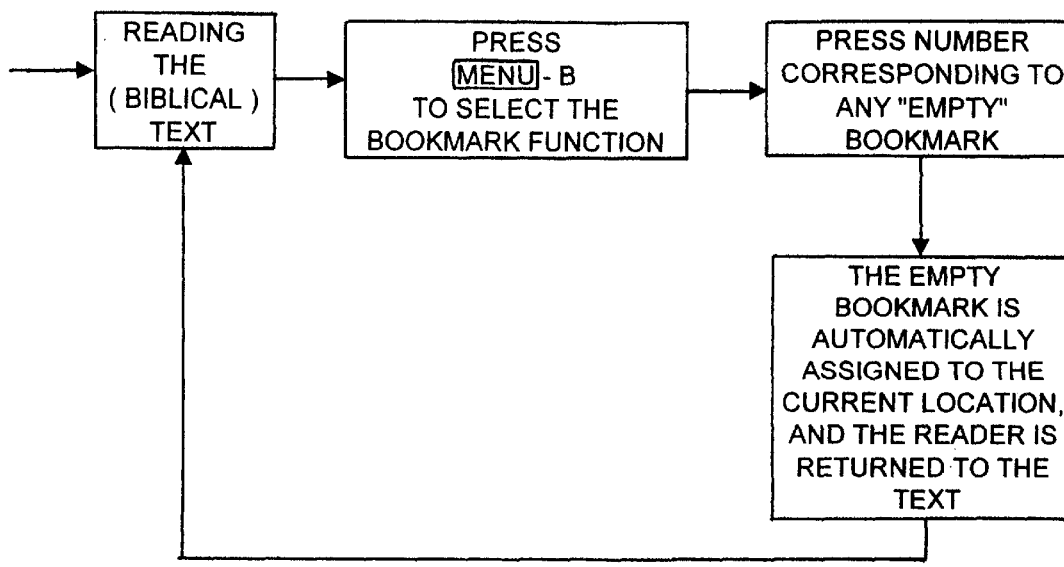
FIG. 2b provides a flow chart illustrating the operation of electronic bookmarks in accordance with the invention.
Figure 2B:
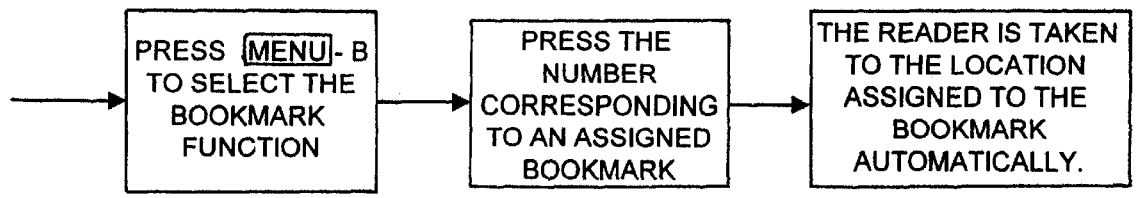

A flow chart is presented in FIG. 2b illustrating the logical steps for setting a bookmark and for going to a marked location.

Syntax Accommodations

A significant simplification provided by device 10 is the internally programmed provision to accommodate a wide variety of formulations in the "read" mode. For example, I KINGS or KINGS I will get the reader to same place in the text. The device has a grammar of syntaxes such that all of the following will result in the same read position being brought up on the screen:

IKG
KING I
KG1
FIRST KINGS
I KINGS

The following table illustrates the scope of these syntactical accommodations (=space character(s)):

TABLE I

I. Booknames:
  1. Books without
     "volume number"   May be specified by the
                       full name or any two-or-more
                       character abbreviation that
                       begins with the first character
                       of the name, and omits letters
                       at the user's discretion.
                       The abbreviation will work,
                       provided it is unique to one
                       book.

TABLE I-continued

|  |  |  |  |
|---|---|---|---|
|  |  | e.g. for the book "MATTHEW", the following are adequate: MT, MAT, MATT, MW, MTW, etc. but <u>not</u> MH, since this could also stand for "MICAH". |  |
| 2. Books <u>with</u> a "volume number" |  | The book name exclusive of the volume number may be abbreviated as described above. The understood formats for volume number are illustrated below for the book "2 CORINTHIANS" |  |
|  | ROMAN NUMERALS: | II COR IICOR | COR II |
|  |  |  | (CORII not recognized) |
|  | SPELLED OUT VOLUME #: | SECOND COR SECONDCOR | COR SECOND CORSECOND |
|  | CARDINAL NUMBERS: | 2 COR 2COR | COR 2 COR2 |
|  | ORDINAL NUMBERS: | 2ND COR 2NDCOR | COR 2ND COR2ND |
| II. Chapter Specification: Recognized Formats: | 1. | "1" "5" "26", etc. (simple cardinal numbers) |  |
|  | 2. | "CHAPTER 5" "CHAP 5", "CHAP5" |  |
| III. Verse Specification: Recognized Formats: | 1. | "1", "5", etc. |  |
|  | 2. | "VERSE 5", "VERSE5" |  |

(Note we have used the "COR" abbreviation for "CORINTHIANS". Any abbreviation legal according to section 1 will work).
Final note:
The book/volume name, chapter specification, and verse specification <u>may</u> but <u>neednot</u> be separated from each other by space characters in the user's query.
Exception:
Cardinal numerals (0–9) may <u>not</u> be adjacent if they do not belong to the same number; i.e. the chapter number and verse number <u>must</u> be separated by at least one space if there is no "VERSE" string in between.

Triple Level of Linguistic Range (Search Expansion)

The device will, in the first instance, search a designated word, and its possessive, and its capitalized forms (level 1). An example of a level 1 search is that a search for the word KING will cause a search for the following: king, king's, King, King's, KING. A total of 5 forms are searched simultaneously. It should be noted that level 1 obviates the need for having apostrophe and "shift" keys on the keyboard.

This search may be expanded in two additional ways. A second expanded level (level 2) of a search is provided by pressing the single "?"key, which choice is listed on the MENU (following the pressing of the MENU key). The device expands the search by using all forms (inflections as well as other syntactically related words) of the entered words. For example, the entry of the words MOVE WATER will initially find no correspondence in the search of the bible text. By expansion to include "moved" and "waters", a number of locations in the text corresponding to variations of these words will be found. The search could be started by first entering "MOVE? WATER?" to indicate that all forms of the words are to be searched in level 2. If "move water" were entered initially with no "?"s, a rapid way of adding the "?"s to each word without retyping is to press the MENU key and then the "?" key.

A further level of search expansion (level 3) will expand the search by utilizing words which are different but similar in meaning such as provided in a Thesaurus. For example, "water" and "sea" would be equivalent words from this point of view. This is particularly helpful in searching for passages on a given theme in an electronic text or for words recalled from a different translation of the text source. In order to do this, the user is required to insert a double question mark following each word of the search phrase. For example, a phrase which may be entered is "VOICE ?? CALL ?? DESERT ??". This would eventually develop among the various places to be read the following at Isaiah 40:3:

"The voice of him that crieth in the wilderness, Prepare ye the way of the LORD, make straight in the desert a highway for our God."

A more experienced user may wish to mix different search levels in his or her search request. This may be done freely on different words of the query, for example: "VOICE CRY? DESERT??" will also find Isaiah 40.3 (cf., with p. 9, lines 23ff). All three search levels are expressed in this request.

Figure 2C:
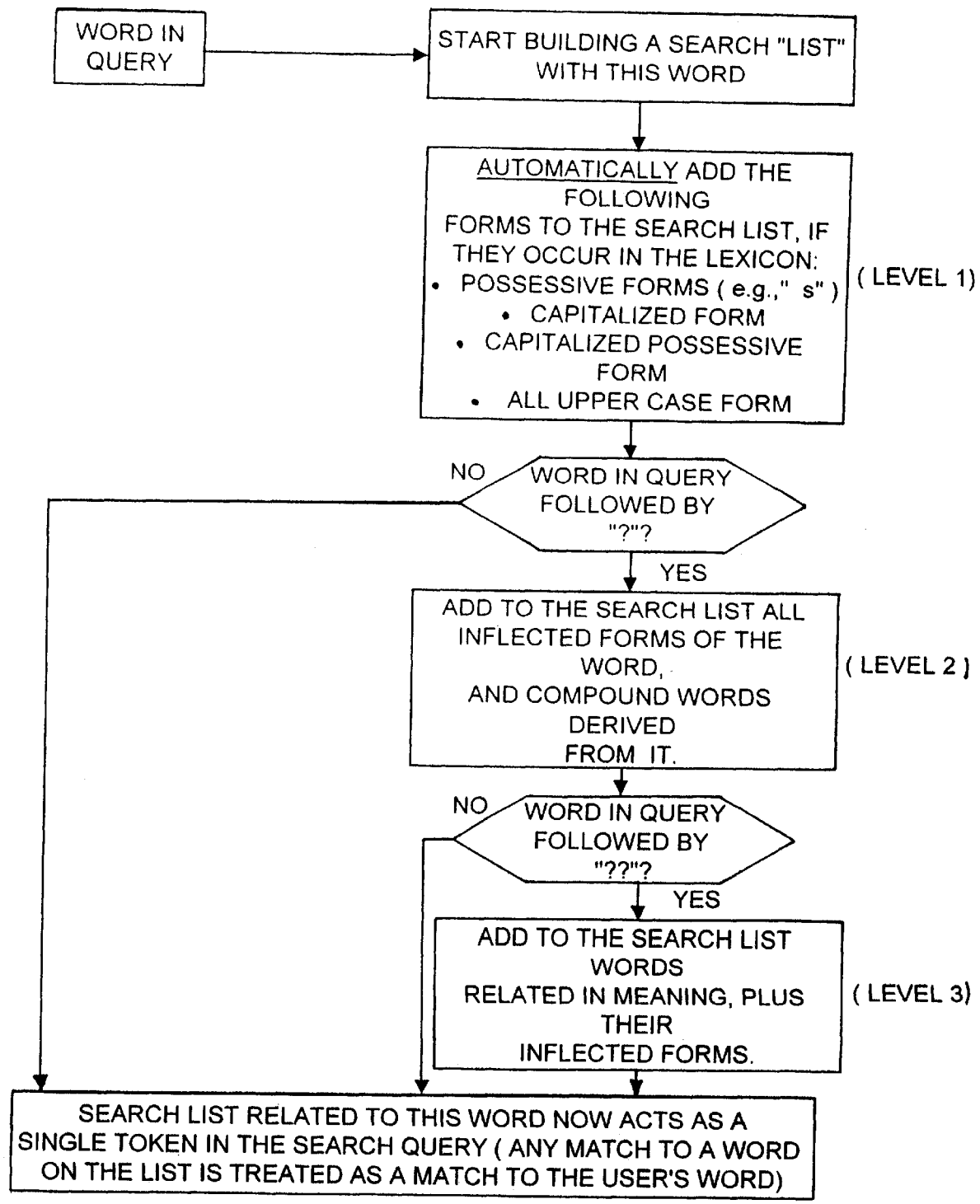
FIG. 2c is a flow chart illustrating three levels of linguistic range in a cco rdance with the invention.

FIG. 2c is a flow chart illustrating the three levels of linguistic range possible with the device.

In a further variation of search expansion, the expansion terms may be added or rejected one by one in a non-automatic manual mode. This is known as the "Approvals" mode obtained by first pressing the MENU key followed by the designated key for approvals ("A").

Display Map

In the Biblical embodiment for the electronically stored text, each book that may have text relevant to the entry word or phrase is displayed at a fixed location on the screen. Thus all of the books of the Bible have their own separate positional display location on the screen. The screen location of each book is always fixed. Only those books which are relevant are displayed at any time after a query is submitted by the user. This includes displaying which books contain matches to the user's query. A "flashing" icon representing a particular book selection serves as a cursor to assist the reader to indicate which book the user is in while reading the text. The display map in essence is an animated map of the stored text and provides a continuous "image" of the operational state of the device. The fixed display location for each book and the "flashing" icon representing a book while its text is being read greatly facilitate utilization of the device by the user.

Figure 2D:
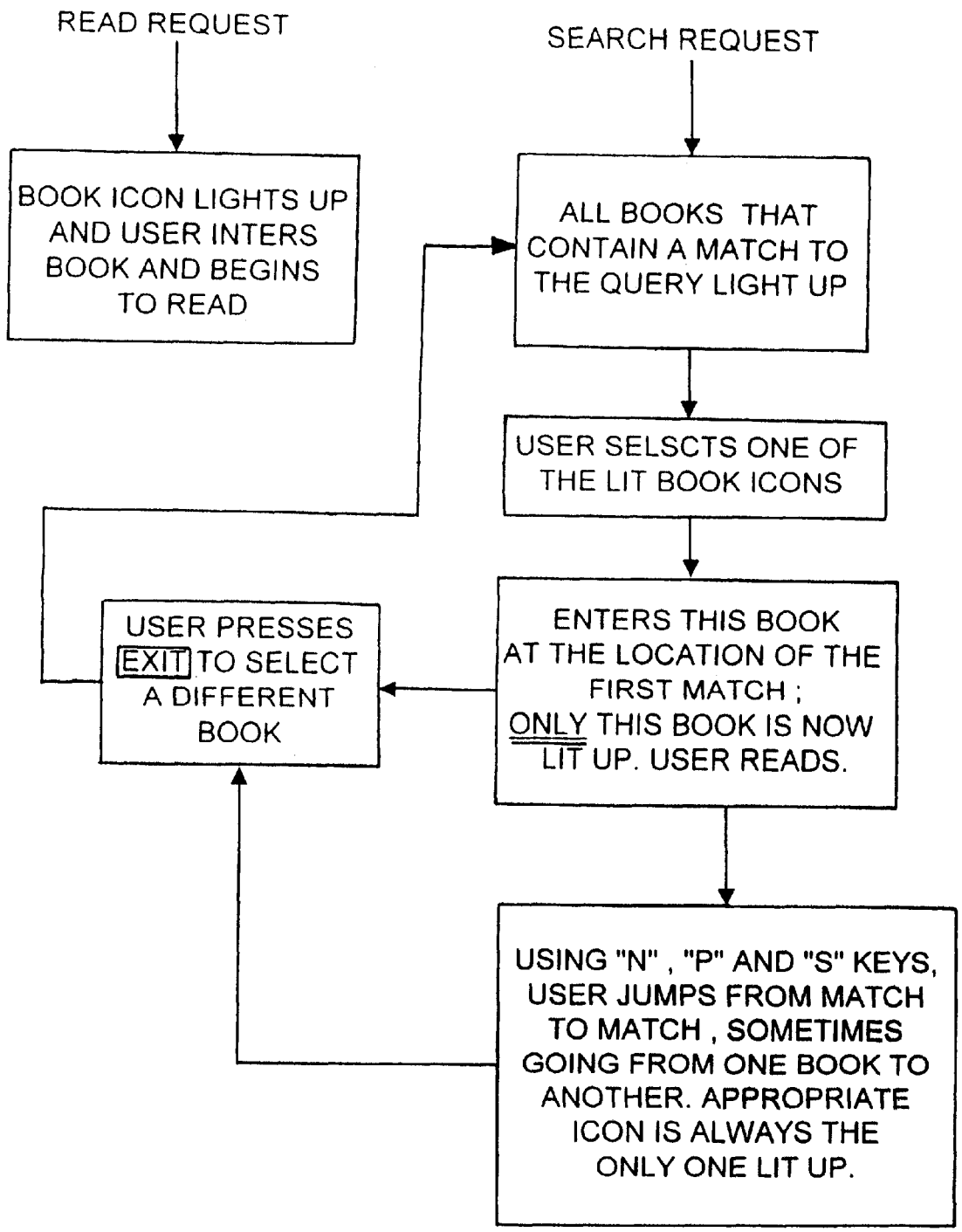
FIG. 2d is a flow chart illustrating the use of a display map in "read" and "search" modes in accordance with the invention.

FIG. 2d is a flow chart illustrating the use of the display map in both "read" and "search" modes.

Search Denotation

A further programmed simplification is that the device will designate, by underlining, which words of a phrase will be searched in the "search" mode. For example, when the phrase "the meek shall inherit the earth" is entered, only the significant terms "meek", "inherit" and "earth" are actually searched. These words are underlined so that the user knows that the search is limited to those three words significant. The device then performs a search limited to only these words of the phrase.

Figure 2E:
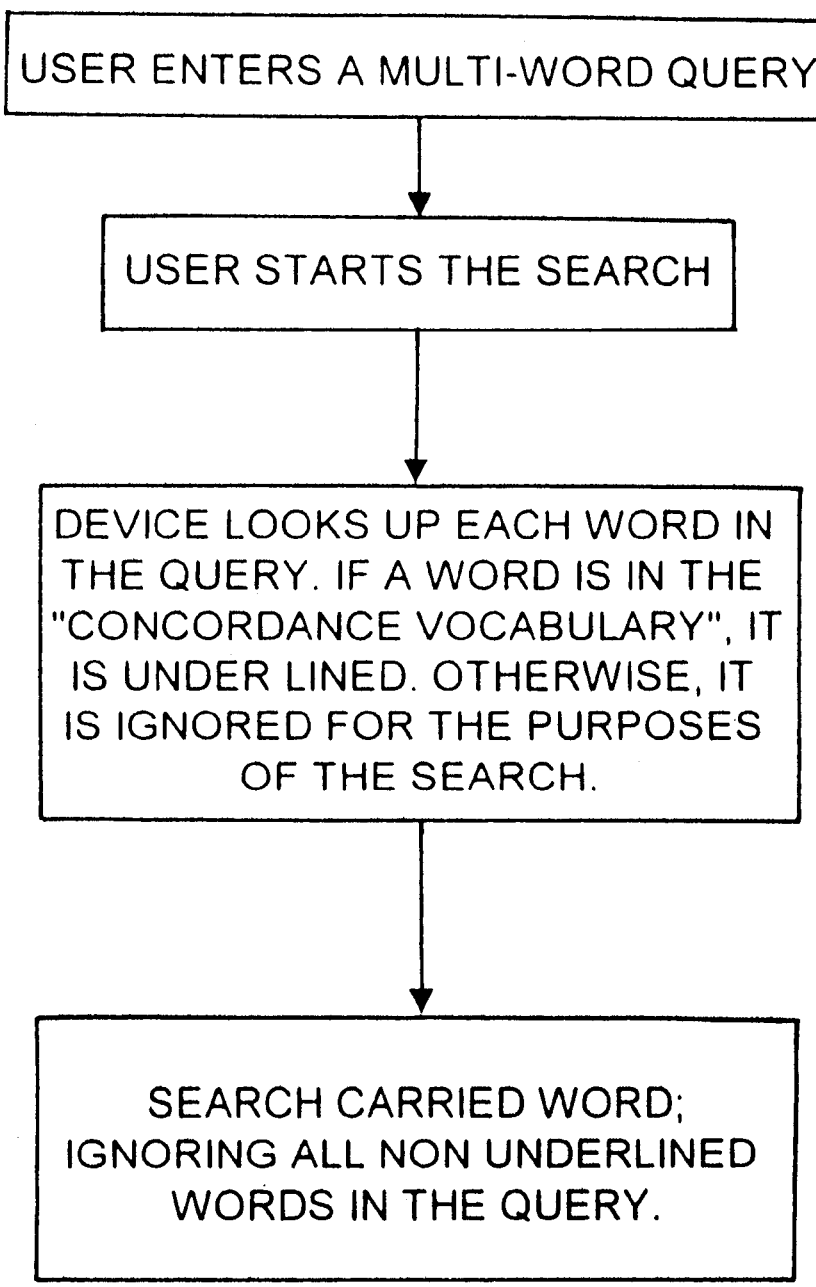
FIG. 2e is a simplified flow chart illustrating how a search request may be limited in accordance with the invention.

FIG. 2e is a simplified flow chart illustrating how the device will limit a search request.

Context-Sensitive "Help" System

In prior techniques involving reading or searching electronically stored material, the pressing of a "HELP" key would provide descriptive assistance to the user on the screen. Such assistance, however, was of a predetermined, fixed form and was not related to the then current operating situation.

In the present device, by distinctly defining the internal operational phases, user assistance is provided which is directly related to the current operational point reached by the user. The user is provided with appropriate options related to the operational point reached.

Figure 2F:
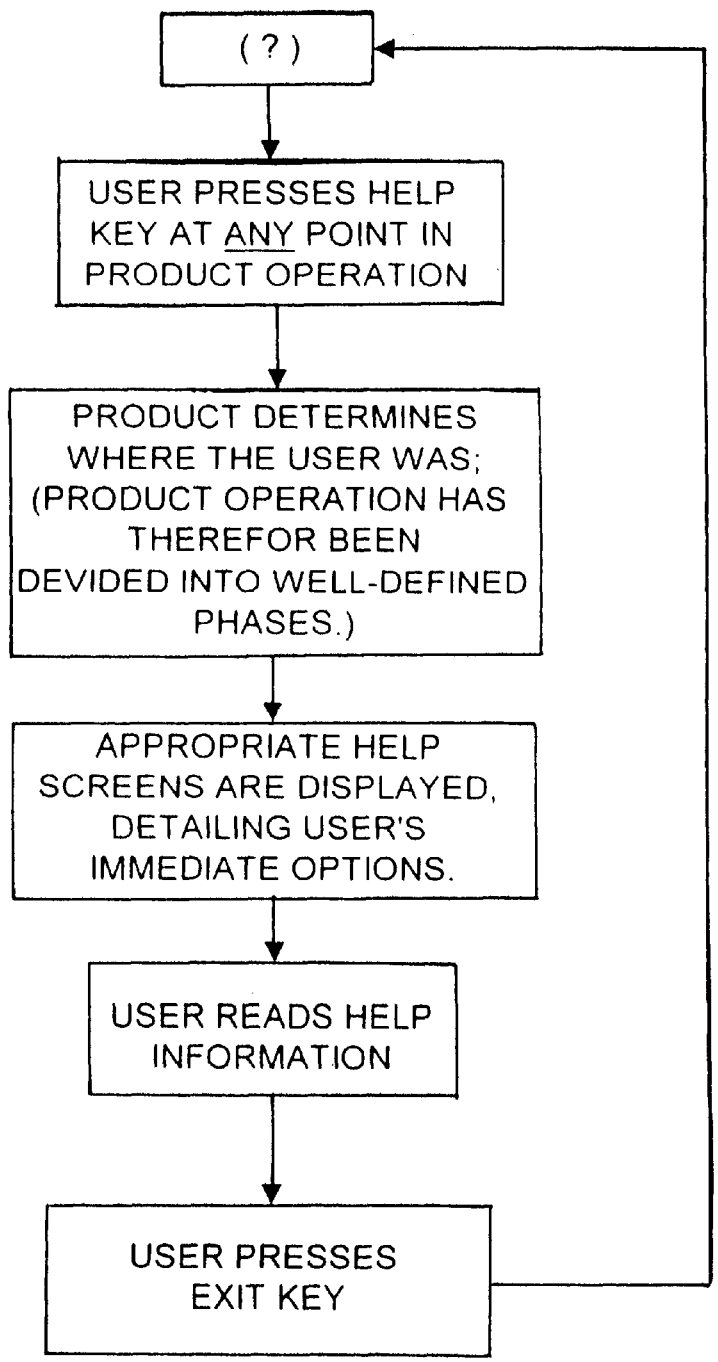
FIG. 2f is a flow chart illustrating a context-sensitive "Help" system in accordance with the invention.
Figure 2G:
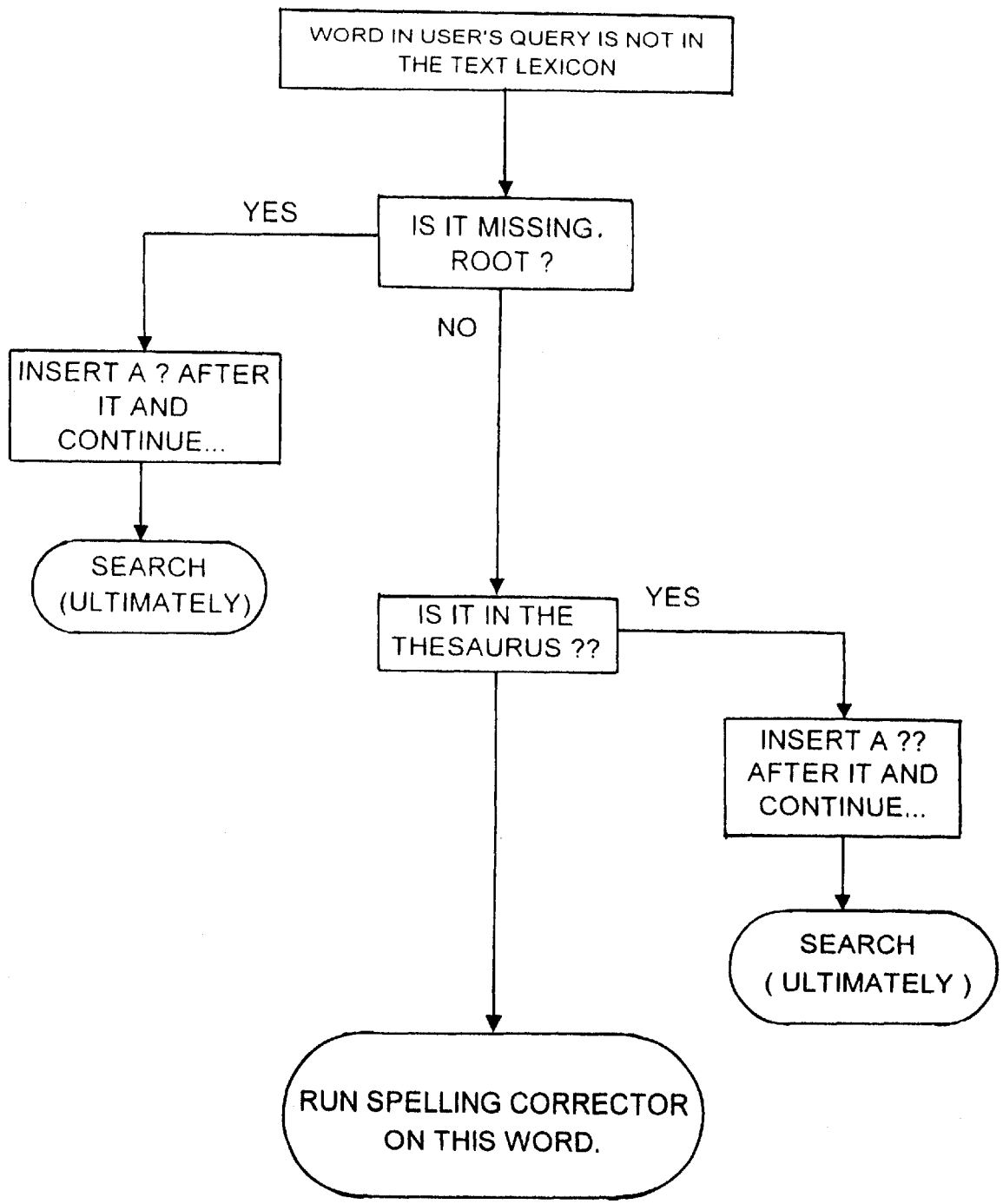
FIG. 2g is a flow chart illustrating how linguistic range expansion is "pruned" by the lexicon in accordance with the invention.

FIG. 2f provides a flow chart for illustrating this context-sensitive "Help" system.

"Pruning" of Linguistic Range Expansion

The flow charts (2c, 2g) make reference to "the lexicon", (well defined in the simultaneously filed application incorporated by reference herein), i.e., the product's internal lexicon of words making up the text. Linguistic range expansion is always, at each step, "pruned" by the lexicon, as further illustrated in flow chart 2g. This pruning happens quasi-automatically as programmed into the device.

If any word in the user's query is not found in the lexicon of the text, a series of steps is performed as follows:

1. The device has a list of "missing root words ". These are words which have inflected forms that occur in the text, but the simplest form does not; e.g. the word "babble " is not in the Bible, but "babbler" is. If the user's word is one of the "missing roots" (like babble), a single ? is added absolutely automatically by the device, which generates a level 2 search with no keystrokes pressed.
2. If the word does not match the missing root list, then it is checked to see if it occurs in the thesaurus. If it occurs, a double ? is added, generating an automatic level 3 search.
3. If both steps 1 and 2 fail, then the device assumes a misspelling, and the spelling corrector is run.

The Annexed Listings (Appendix A)

Appendix A is a microfiche version of all of the listings required for programming a complete electronic book (Bible) including the inventive features described above. the listings are in two parts: a Program Listing (approximately 200 pages) of the internal operations of the device and a Primary Compression Method Listing (approximately 92 pages) for compression of the Biblical text. The inventive features of the present application are included in the first listing together with other functions (e.g. display, enter etc.) not forming part of this invention. The Appendix A listing is primarily in C code with a small amount of assembly code.

The above embodiment of an electronic text, the Bible, is only one example of the general case of electronic stored text information. The "book, chapter and verse" reflects, in terms of the Biblical embodiment, the fact that in a text, locations are often specified with multiple components (some of them omittable).

While the foregoing description and drawings represent the preferred embodiments of the present invention, it will be obvious to those skilled in the art that various changes and modifications may be made therein without departing from the true spirit and scope of the present invention.

What is claimed is:

1. A method of providing user access to stored textual information in an electronic book having a digital memory, entry keys, a display screen and a microprocessor for implementing the method, said stored textual information being comprised of sections of textual information, each of said sections being identified by a respective section identifier, said method comprising the steps of:

receiving a user entry from a user of said electronic book;

parsing said user entry by recognizing said user entry as a read mode request if said user entry corresponds to any one of said section identifiers, and by recognizing said user entry as a search mode request if said user entry does not correspond to any one of said section identifiers, displaying, when said user entry is recognized as a read mode request, at least a portion of said section of textual information having said section identifier to which the user entry corresponds; and searching, when said user entry is recognized as a search mode request, through each of said sections of textual information for at least one occurrence of said user entry, displaying on said display screen of said electronic book a list of the section identifiers of those sections of textual information in which said at least one occurrence of said user entry is found, receiving a second user entry from said user, and displaying a portion containing the first user entry of the section of textual information having said section identifier to which the second user entry corresponds.

2. A method of providing user access to stored textual information in an electronic book having a digital memory, entry keys, a display screen and a microprocessor for implementing the method, said stored textual information being comprised of sections of textual information, each of said sections being identified by a respective section identifier, said method comprising the steps of:

receiving a user entry from a user of said electronic book, parsing said user entry by recognizing said user entry as a read mode request if said user entry corresponds to any one of said section identifiers and said user entry is not included within any of said sections of textual information, by recognizing said user entry as a search mode request if said user entry does not correspond to any one of said section identifiers, and prompting said user to indicate whether the user entry is a read mode request or a search mode request when said user entry corresponds to one of said section identifiers and said user entry is included within at least one of said sections of textual information, displaying, when said user entry is recognized as a read mode request, at least a portion of said section of textual information having said section identifier to which the user entry corresponds; and searching, when said user entry is recognized as a search mode request, through each of said sections of textual information for at least one occurrence of said user entry, and displaying on said display screen of said electronic book a list of the section identifiers of those sections of textual information in which said at least one occurrence of said user entry is found.

3. The method of claim 1, wherein said step of receiving is carried out by receiving from said user a single line of textual information as said user entry.

4. The method of claim 1, wherein each of said sections of stored textual information is comprised of a respective plurality of chapters of textual information, each of said chapters of each section being identified by a respective chapter identifier;

said section of textual information having said section identifier to which the user entry corresponds is a selected section; and said step of displaying when said user entry is recognized as a read mode request is carried out:

by displaying, when said user entry further corresponds to one of said chapter identifiers of the chapters included within the selected section, a portion of said chapter within the selected section having said chapter identifier to which the user entry further corresponds, and by displaying, when said user entry does not further correspond to any one of said chapter identifiers of the chapters included within the selected section, a portion of a first of said chapters within the selected section.

5. The method of claim 5, further comprising the step of displaying, when said user entry is recognized as either a read mode request or a search mode request, on said display screen a map of different fixed locations corresponding to respective different portions of the textual information.

6. The method of claim 1, further comprising the step of expanding the searching performed during said searching step to include different words having similar meaning to selected words included in said user entry.

7. An electronic book for providing access to stored textual information, comprising:

a digital memory having stored therein sections of textual information, each of said sections being identified by a respective section identifier;

means for receiving a user entry from a user;

parsing means for parsing said user entry by recognizing said user entry as a read mode request if said user entry corresponds to any one of said section identifiers, and by recognizing said user entry as a search mode request if said user entry does not correspond to any one of said section identifiers;

display means for displaying, when said user entry is recognized as a read mode request, at least a portion of said section of textual information having said section identifier to which the user entry corresponds; and means for searching, when said user entry is recognized as a search mode request, through each of said sections of textual information for at least one occurrence of said user entry, and for controlling said display means to display a list of the section identifiers of those sections of textual information in which said at least one occurrence of said user entry is found, wherein said means for receiving is operable, when said list of section identifiers is displayed, to receive a second user entry from said user; and said display means displays a portion containing the first user entry of the section of textual information having said section identifier to which the second user entry corresponds.

8. An electronic book for providing user access to stored textual information, comprising:

a digital memory having stored therein sections of textual information, each of said sections being identified by a respective section identifier;

means for receiving a user entry from a user;

parsing means for parsing said user entry by recognizing said user entry as a read mode request if said user entry corresponds to any one of said section identifiers and said user entry is not included within any of said sections of textual information, and by recognizing said user entry as a search mode request if said user entry does not correspond to any one of said section identifiers, said parsing means including means for prompting said user to indicate whether the user entry is a read mode request or a search mode request when said user entry corresponds to one of said section identifiers and said user entry is included within at least one of said sections of textual information;

display means for displaying, when said user entry is recognized as a read mode request, at least a portion of said section of textual information having said section identifier to which the user entry corresponds; and means for searching, when said user entry is recognized as a search mode request, through each of said sections of textual information for at least one occurrence of said user entry, and for controlling said display means to display a list of the section identifiers of those sections of textual information in which said at least one occurrence of said user entry is found.

9. The electronic book of claim 7, wherein said means for receiving receives from said user a single line of textual information as said user entry.

10. The electronic book of claim 7, wherein each of said sections of stored textual information is comprised of a respective plurality of chapters of textual information, each of said chapters of each section being identified by a respective chapter identifier;

said section of textual information having said section identifier to which the user entry corresponds is a selected section;

said display means displays, when said user entry is recognized as a read mode request and said user entry further corresponds to one of said chapter identifiers of the chapters included within the selected section, a portion of said chapter within the selected section having said chapter identifier to which the user entry further corresponds; and said display means displays, when said user entry is recognized as a read mode request and said user entry does not further correspond to any one of said chapter identifiers of the chapters included within the selected section, a portion of a first of said chapters within the selected section.

11. The electronic book of claim 7, wherein said display means displays, when said user entry is recognized as either a read mode request or a search mode request, a map of different fixed locations corresponding to respective different portions of the textual information.

12. The electronic book of claim 7, further comprising means for expanding the searching performed by said means for searching so as to include different words having similar meaning to selected words included in said user entry.

* * * * *